UNITED STATES PATENT OFFICE.

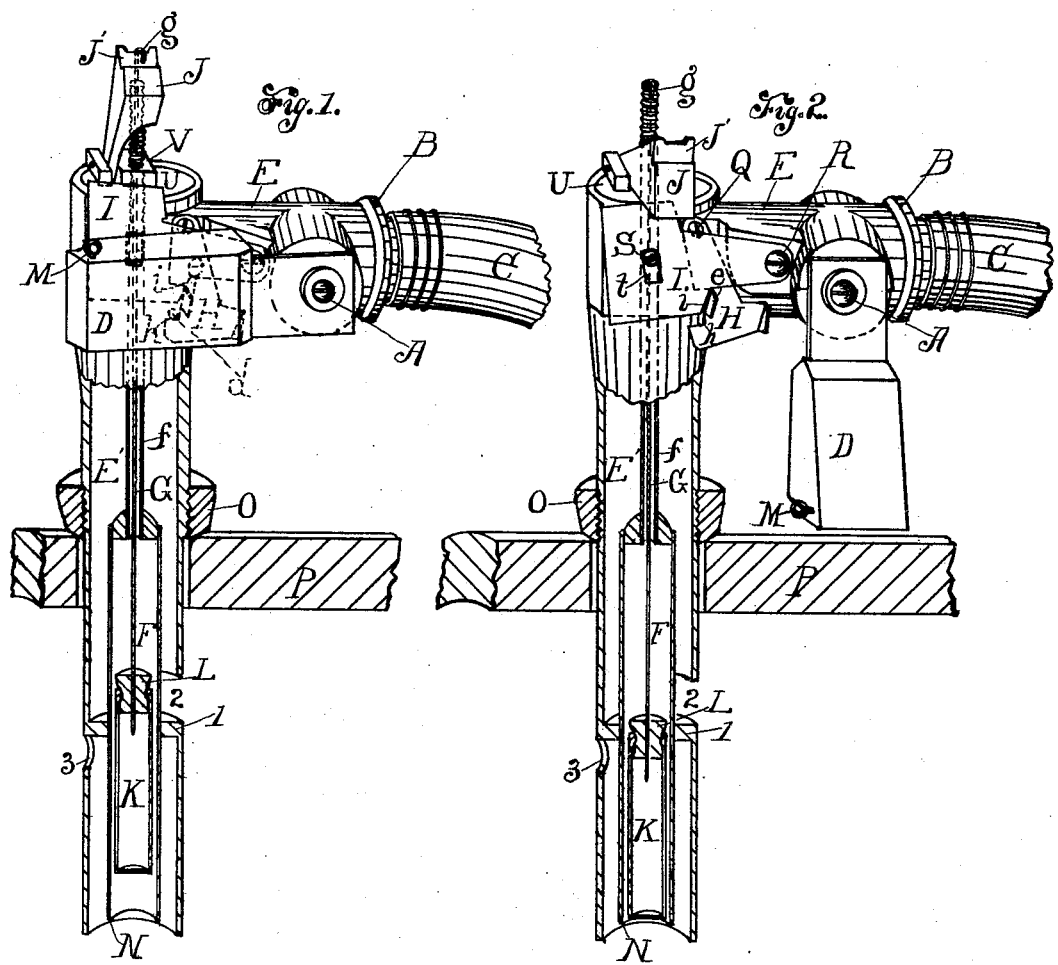

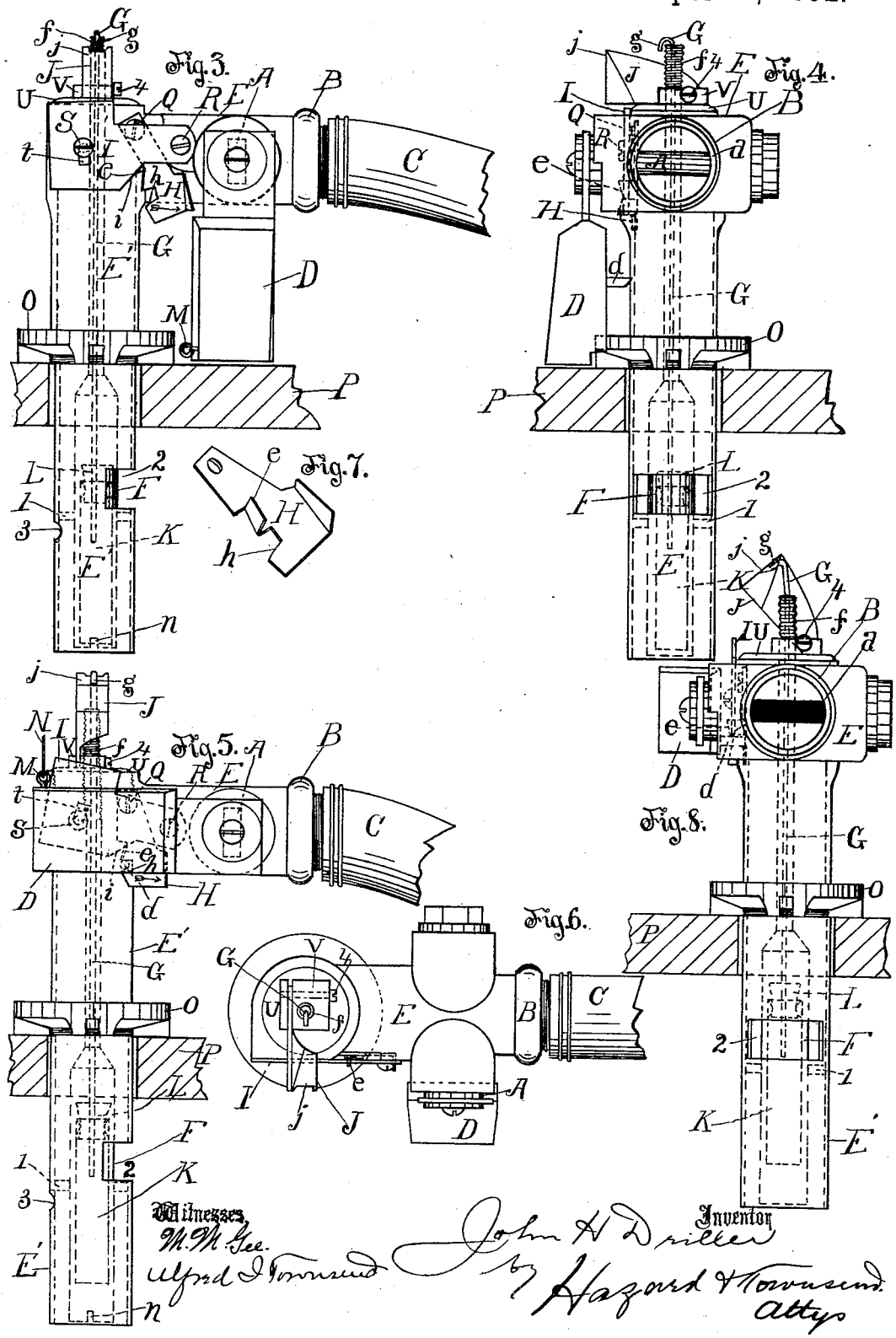

JOHN H. DRILLER, OF LOS ANGELES, CALIFORNIA.

AUTOMATIC-CUT-OFF CASK-FILLING FAUCET.

SPECIFICATION forming part of Letters Patent No. 482,342, dated September 13, 1892.

Application filed May 22, 1891. Serial No. 393,681. (No model.)

*To all whom it may concern:*

Be it known that I, JOHN H. DRILLER, a citizen of the United States, residing at Los Angeles, in the county of Los Angeles and State of California, have invented a new and useful Automatic-Cut-Off Cask-Filling Faucet, of which the following is a specification.

This invention is especially designed for use where casks or other receptacles are filled through a hose.

The object of my invention is to provide delicately-sensitive mechanism which will be operated by the rising liquid within the cask or other receptacle being filled with the liquid, which will cut off the flow of liquid from the hose when the receptacle is filled to the point desired, and which can be easily and accurately adjusted to operate to cut off the flow at different heights, as may be desired.

This invention is especially adapted for use where the liquid is introduced into the cask under pressure, and therefore must be shut off by means of a faucet, which necessarily requires considerable force for its operation.

My invention comprises the combination of a suitable faucet head and plug, operative means connected with the plug to normally close it, a device for retaining such plug-operating means in its set position to hold the faucet open, intermediate means for disengaging such retaining device, a float arranged to be operated by the rising liquid, and a rod connected therewith and provided at its upper end with a retaining-arm arranged to retain such intermediate disengaging means and to release the same when such rod is raised.

The accompanying drawings illustrate my invention.

Figure 1 is a perspective view of the filler open. Fig. 2 is a perspective view of the filler closed. Fig. 3 is a plain side elevation of my cask-filling faucet with the parts in position to cut off the liquid. Fig. 4 is a plain elevation at right angles to the line of view of Fig. 1. Fig. 5 is a side elevation with the parts in the position they occupy when the faucet is open. Fig. 6 is a top view with the faucet closed. Fig. 7 shows the supporting-catch detached. Fig. 8 is a view corresponding to Fig. 2 with the faucet open.

A is the faucet-plug.

B is the nipple, upon which is attached the hose C.

D is the weight fixed to the faucet-plug and arranged to hang down when the faucet-plug is turned to shut off the opening $a$ through the faucet.

E E' is the faucet-head formed of the receiving member E and the vertical stem E', which is adapted to be introduced into the cask through the bung-hole.

F is a float-containing tube or chamber open at its lower end and secured within the stem E', at the bottom thereof, and connecting with the air through the smaller rod-tube $f$, which admits the hammer-holding float-actuated rod G, provided at its upper end with a retaining-arm $g$, arranged to retain the disengaging-hammer.

The float-containing tube or chamber F is arranged with its lower end above the lower end of the faucet-stem E', and such stem E' is provided with a transverse partition 1 and a side discharge-opening 2, so that the liquid flowing through the faucet passes out through the side opening, and the interior of the float-containing tube F will be protected against becoming clogged with foam, the liquid flowing from the side opening 2 of the stem E', serving to drive the foam away from the bottom of the stem.

3 is a vent to allow the escape of air from the lower part of the stem. The plug-actuating weight D is provided with a supporting pin or projection $d$.

H is a pivoted supporting catch-plate provided with the weight-supporting shoulder $h$ and the trigger-supporting shoulder $e$. The supporting catch-plate H is pivoted so that its weight-sustaining shoulder $h$ can be swung into position beneath the pin $d$, as shown in dotted lines in Fig. 5, to sustain such pin when the weight D is raised to open the faucet, as shown in Figs. 5 and 8.

I is the pivoted catch-releasing trigger provided with the catch-engaging shoulder $i$, which is arranged diagonal to the axis of the trigger to rest upon the trigger-shoulder $e$ of the pin-supporting catch-plate H.

In Fig. 5 the positions of the trigger and the catch are shown in dotted lines.

J is the trigger-actuating hammer pivoted to the top of the faucet and arranged to engage the trigger when the trigger is in its elevated position, as shown in Figs. 5 and 8, and the hammer is in its released position. (Shown in Figs. 3 and 4.)

The rod G is provided at its upper end with the hammer-retaining hook $g$, and the outer end of the hammer is provided with suitable hook-receiving face or retaining surface $j$, arranged to receive the hook $g$, which will prevent the hammer from falling so long as the hook $g$ is in its position to retain the hammer, as shown in Figs. 5 and 8.

K represents a suitable float within the float-tube F and secured to the lower end of the hammer retaining and releasing rod G. The float K is preferably made of a light glass flask provided with a suitable cork stopper L, through which the lower end of the rod G is thrust to be retained by the friction of the rod and cork, thus allowing for the vertical adjustment of the float to bring it into such position that the liquid within the barrel will operate upon the float at the time desired to elevate such float, and the rod G, secured thereto, to release the hammer and allow it to fall upon the trigger I to drive such trigger down to engage with its sloping shoulder $i$ the shoulder $e$ of the sustaining catch-plate H, thus to force the catch-plate in the direction of the arrow in Fig. 5 to drive the shoulder $h$ out from beneath the pin $d$, thus to allow the weight D to fall into its normal position (shown in Figs. 3 and 4) to close the faucet.

M is a suitable eye secured to the weight for the purpose of attaching a thread or suitable cord N thereto to connect the weight with a suitable signal, such as a bell or flag to be rung or displayed by the fall of the weight.

The hammer J and trigger I comprise the intermediate means for disengaging the retaining device H. The rod-tube $f$ projects upward from the head of the faucet to form a brace for the rod G and is arranged between the pivot 4 of the hammer J and the hook-engaging face $j$, so that when the hammer J is raised and the hook $g$ is hooked upon the face $j$ the rod G will be drawn against the tube $f$ and will thereby be supported.

In practice the faucet is attached to the hose C, which leads from the pump or reservoir of supply.

The float K is adjusted to such a height upon the rod G with relation to the supporting-flange O, which is provided to rest upon the cask P to sustain the faucet, so that when the faucet is in position in the cask, as shown in the drawings, the liquid in the cask, when filled as much as desired, will raise the float to release the hammer. This point may be determined by experiment with but little difficulty. When thus adjusted, the faucet is set in the cask, the weight D is raised, and the catch $h$ is placed beneath the pin $d$ to sustain the weight. The pivoted trigger-operating hammer J is raised and the hook $g$ of the rod G is hooked thereupon to retain it in its raised position. When the weight D is raised, the faucet is opened, thus allowing the liquid to pass into the cask from the hose C. When the liquid reaches the desired height, the float K is raised sufficiently thereby to cause the hook $g$ to clear the engaging-face $j$ of the hammer J, thus allowing J to fall upon the trigger I to drive it down to cause $i$ to swing the catch-plate H back to release the pin $d$ and allow the weight D to fall, thus to turn the cut-off plug A to close the faucet.

Q and R are the pivots sustaining the catch-plate and trigger.

S is the stop fixed to the faucet-head and passing through the slot $t$ in the trigger to limit the movement of the trigger.

For convenience of construction the head or top of the vertical stem E' is closed with a screw-plug U instead of being integrally closed. V is the nut by which it is turned to screw it into or out of the stem. This nut forms a support for the hammer J, which is pivoted thereto.

It is to be understood that the rod G should be as light as possible consistent with the necessary strength and rigidity. I prefer to make it of No. 19 steel wire well tempered.

The weight D may be operatively connected with the plug A by intermediate mechanism, and operative mechanism—e. g., a spring—may be supplied in place of such weight without altering the principle of my invention.

The float and rod containing tube F is secured in position by the rod-containing portion $f$ of said tube, which is screw-threaded at the top and is screwed through the top plate or plug U, and can therefore be adjusted as to height by screwing it up or down.

$n$ is a slot in F for the insertion of a screw-driver to turn the tube F.

Now, having described my invention, what I claim as new, and desire to secure by Letters Patent, is—

1. In a barrel-filling device, the combination of a suitable faucet-head and plug, operative means connected with the plug to normally close it, a trigger for retaining such plug-operating means in its set position to hold the faucet open, and a hammer pivoted to the faucet and arranged to normally rest upon such trigger, a float arranged to be operated by the rising liquid within the barrel, and suitable means detachably connecting the float with such hammer to hold the hammer elevated above such trigger and arranged to be lifted out of its engagement with the hammer when the rising liquid elevates the float, thereby releasing the hammer to allow it to fall to actuate the trigger to release the plug-closing device.

2. In a cut-off faucet of the class set forth, the combination of operative means connected with the plug to normally close it, the pivoted catch-plate provided with the weight-sustaining shoulder and the trigger-supporting shoulder, the pivoted catch-releasing trigger provided with the diagonally-arranged catch-engaging shoulder, the trigger-actuating hammer, and means for retaining and releasing the same connected with a float to be operated by the rising liquid.

JOHN H. DRILLER.

Witnesses:
JAMES R. TOWNSEND,
ALFRED I. TOWNSEND.